US006765787B2

(12) United States Patent
Beasley, III et al.

(10) Patent No.: US 6,765,787 B2
(45) Date of Patent: Jul. 20, 2004

(54) DEVICE AND METHOD FOR PROVIDING ELECTRIC SERVICE

(75) Inventors: Max Hartwell Beasley, III, Plano, TX (US); Alfred L. Mayfield, Fort Worth, TX (US)

(73) Assignee: Basic Resources Inc., Dallas, TX (US)

( * ) Notice: Subject to any disclaimer, the term of this patent is extended or adjusted under 35 U.S.C. 154(b) by 102 days.

(21) Appl. No.: 10/259,296

(22) Filed: Sep. 30, 2002

(65) Prior Publication Data

US 2004/0070894 A1 Apr. 15, 2004

(51) Int. Cl.[7] .................................................. H02B 7/00
(52) U.S. Cl. ........................................ 361/641; 174/48
(58) Field of Search ................................ 361/634, 641, 361/643, 644, 659–673, 652; 174/37–39, 48, 49; 307/147, 328; 439/189, 517, 539

(56) References Cited

U.S. PATENT DOCUMENTS

| | | | | |
|---|---|---|---|---|
| 5,216,802 A | * | 6/1993 | Cole et al. ..................... 29/825 |
| 5,404,266 A | * | 4/1995 | Orchard et al. ............. 361/667 |
| 5,418,683 A | * | 5/1995 | Orchard et al. ............. 361/672 |
| 5,638,256 A | * | 6/1997 | Leach et al. ................ 361/641 |
| 6,266,233 B1 | * | 7/2001 | O'Regan ..................... 361/659 |

* cited by examiner

Primary Examiner—Ronald Leja
(74) Attorney, Agent, or Firm—Hunton & Williams LLP

(57) ABSTRACT

An exemplary device and method for providing electric service are disclosed. The exemplary method for providing construction power during the construction of a facility and providing permanent power at the facility thereafter, includes installing an electric service device of the present invention at a construction site that, when energized, is operable to provide metered construction power through an electrical outlet at the device during construction of the facility and to provide metered permanent power at the facility thereafter. The method includes obtaining inspection approval of the installation of the device, and locking the device to provide metered construction power when energized. The method further includes installing a meter in the device to measure energy consumption of metered construction power and metered permanent power, and energizing the device to provide metered construction power at the construction site. Finally, the exemplary method includes obtaining inspection approval of the facility, and unlocking the device to provide metered permanent power.

49 Claims, 6 Drawing Sheets

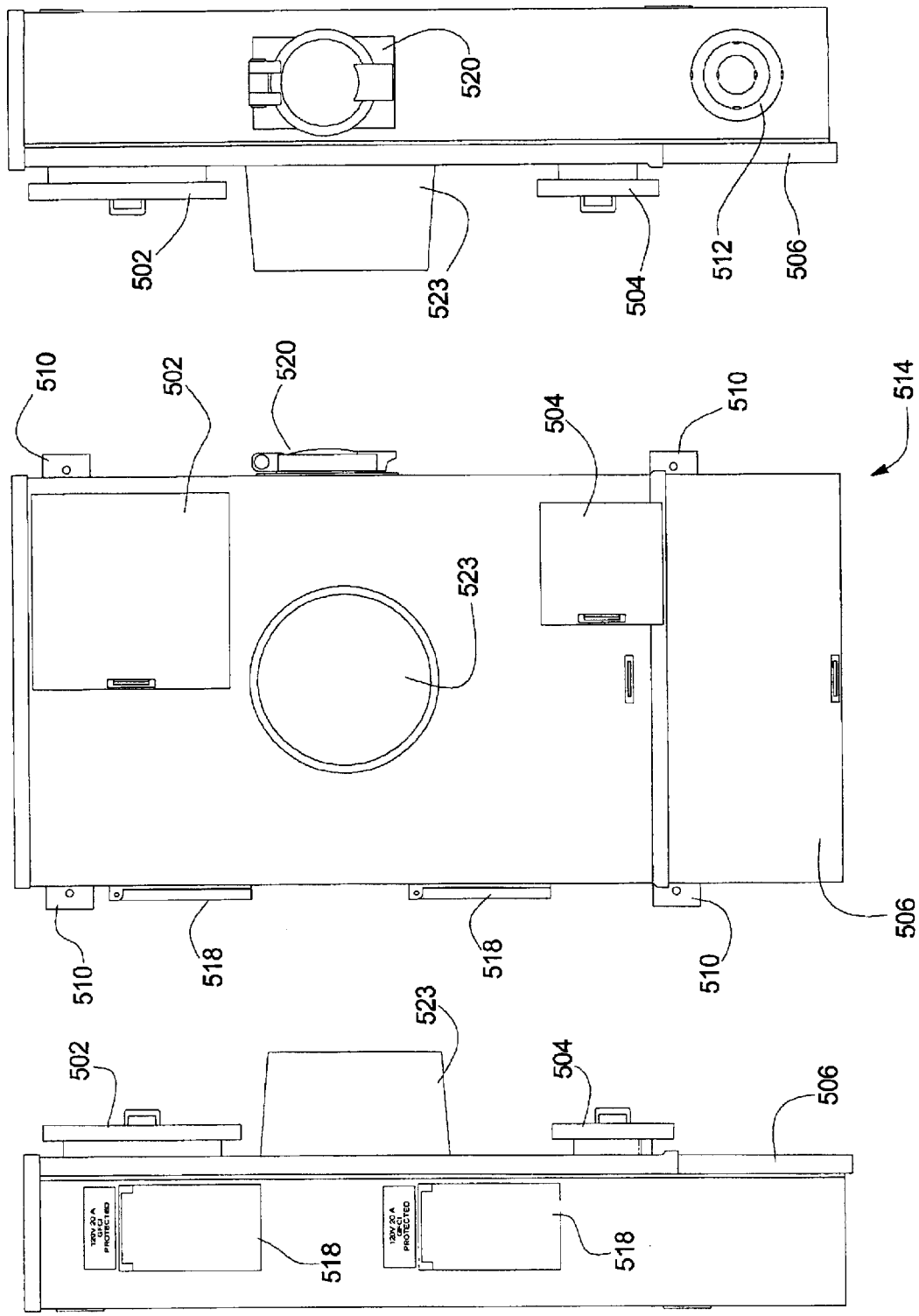

DEVICE AND METHOD FOR PROVIDING ELECTRIC SERVICE

TECHNICAL FIELD OF THE INVENTION

This invention relates in general to the field of electric power and more particularly to a device and method for providing electric service, including both construction power and permanent power.

BACKGROUND OF THE INVENTION

Construction sites typically require a source of electricity to provide power for various devices and uses such as, for example, electrical tools, lighting, and other equipment that may be used at the construction site. During this time, the electricity may be referred to as temporary power or construction power, and such power is generally provided at a construction site by way of a temporary connection to an electrical distribution system or power grid either through an overhead or underground connection. Depending on the regulatory rules that are in force where the construction power is being provided, construction power may be provided solely as unmetered construction power, solely as metered construction power, or as either metered or unmetered construction power.

Prior devices and methods have been used to provide construction power. These prior devices and methods suffer from numerous problems and disadvantages, especially for builders, developers, and contractors. For example, temporary power connections and installations at a construction site are often labor-intensive, time consuming, difficult to install and secure, dangerous, and difficult to maintain. Furthermore, the process of requesting a power connection is a time consuming process that may take an average of 7 to 10 days. Since the timing of power availability is uncertain for the builder, the builder is unable to effectively and efficiently plan and utilize resources toward the construction project.

In a typical procedure for obtaining construction power, a builder installs a temporary service pole (i.e., a structure having the desired wiring), and requests the local inspection authority to inspect the pole, the wiring and the installation.

If the structure is not approved by the inspector, then a red tag, indicating a failed inspection, is placed on the temporary service pole. At that time the builder's electrician is responsible for fixing the problematic portions of the temporary service pole. The builder then requests a subsequent inspection by the local inspection authority. If the inspector approves the temporary service pole, then a green tag is placed on the structure and an approval form is sent by the inspector to the power company that indicates that power may now be connected to the temporary service pole. A similar procedure must be followed when obtaining permanent power to a facility after construction is complete.

The numerous and various problems and disadvantages discussed above and suffered by builders have been exacerbated with the advent of electricity deregulation, which has been implemented throughout numerous countries and in various regions of other countries. Deregulation complicates and increases the difficulties of providing construction power because, often, numerous additional entities become part of the process of setting up, inspecting, approving, and transferring power from construction power to permanent metered power. Further, in regions where electricity is deregulated, an electric service delivery point reference number must be obtained before a meter is ever installed, whether for construction power or permanent power. Depending on the regulatory scheme and regulatory rules, the electric service delivery point reference number may be obtained, for example, from an Independent System Operator ("ISO"), a Transmission Distribution Service Provider ("TDSP"), or by contacting a Retail Electric Provider ("REP").

In Texas, for example, the electric service delivery point reference number is referred to as an ESI-ID and can only be established through the TDSP contacting the ISO. These ESI-IDs are used by the ISO, known in Texas as the Electric Reliability Council of Texas ("ERCOT"), to clearly identify every point of electricity delivery, including temporary service or construction service. The electric service delivery point reference number is important in that it identifies each meter to the ISO, the TDSP, and the applicable REP. A temporary ESI-ID must be obtained for a construction power installation for temporary power. This further prolongs the process because an ESI-ID will also have to be obtained for each facility that is being constructed by the builder at the construction site.

Upon completion of construction at the site there is a need for a final inspection by the inspection authority to ensure that every built structure meets the local building codes. After this inspection the builder has to request permanent power for the structure. This request initiates a second setup of an ESI-ID at the residence. This second ESI-ID can often cause confusion for the ISO, the REP, and the TDSP because there is nothing that specifically identifies an ESI-ID as temporary or permanent and therefore power activation or termination can be easily confused. When the inspection approval form is received by the TDSP from the inspection authority and a request has been made for power at the site, the TDSP schedules the activation of service. The TDSP runs power either overhead or in conduit underground to the permanent meter base. This process can be riddled with problems because the TDSP needs a cleared right of way between the power supply transformer and the meter base. If this right of way is not cleared then a postponement will occur in the activation of permanent power. Keeping a clear right of way is difficult during construction because building materials are constantly being drop shipped to the site in order to complete the project. And the power company typically gives a 21 day window in which it will perform the distribution of power to the permanent location.

The request for permanent power is a time consuming process that takes an average of 7 to 10 days if no problems arise, and may range from 3 to 30 days in other cases. Since the timing of power availability is uncertain, the builder is unable to effectively perform circuit and system tests and complete the finishing work on the building. This is also a critical time for home builder because the home is essentially complete, but because power has not been established at the property, the property cannot be turned over to the new owners. This causes a loss of interest on the capital investment by the builder.

As is clear, numerous problems and disadvantages exist with current devices and methods for establishing and providing construction power at a construction site and then transitioning to providing permanent power at the constructed facility.

SUMMARY OF THE INVENTION

From the foregoing it may be appreciated that a need has arisen for an improved device and method for providing electric service at a construction site that includes both construction power and permanent power. In accordance with the present invention, an alternative device and method are provided to address one or more of the disadvantages and problems outlined above.

According to one aspect of the present invention, an exemplary method for providing electric service is provided. The exemplary method for providing construction power during the construction of a facility and providing permanent power at the facility thereafter, includes installing an electric service device of the present invention at a construction site that, when energized, is operable to provide metered construction power through an electrical outlet at the device during construction of the facility and to provide metered permanent power at the facility thereafter. The method includes obtaining inspection approval of the installation of the device, and locking the device to provide metered construction power when energized. The method further includes installing a meter in the device to measure energy consumption of metered construction power and metered permanent power, and energizing the device to provide metered construction power at the construction site. Finally, the exemplary method includes obtaining inspection approval of the facility, and unlocking the device to provide metered permanent power.

According to another aspect of the present invention, a device to provide electric service to a construction site is provided. The device, which may also include a detachable unit, includes a meter receptacle, one or more electrical outlets, and a switch. The meter receptacle has a supply side and a load side, and is operable to electrically connect between a power source at the supply side and a facility at the load side. The meter receptacle is also operable to receive a meter to measure the electrical energy provided by the power source through the meter receptacle. The one or more electrical outlets are operable to electrically connect to the power source through the load side of the meter receptacle. The switch is operable to position in at least a construction power position and a permanent power position. While in the construction power position, the switch is operable to disconnect the electrical connection between the facility and the meter receptacle. While in the permanent power position, the switch is operable to electrically connect the facility to the meter receptacle. The one or more electrical outlets remain electrically connected to the meter receptacle at least while the switch is in the construction power position.

According to another aspect of the present invention, a detachable device to provide electric service to a construction site is provided. The detachable device to provide electric service includes a permanent unit and a detachable unit. The permanent unit includes means to receive electric power lines, a meter receptacle, a permanent unit connector electrically connected to the meter receptacle, and a mechanism that is operable to open and close the electrical connection between the facility and the load side of the meter receptacle of the permanent unit. The permanent unit connector remains electrically connected to the meter receptacle at least when the electrical connection between the facility and the load side of the meter receptacle of the permanent unit is open. The detachable unit includes a detachable unit connector that is operable to couple with the permanent unit connector and to provide an electrical connection to the meter receptacle of the permanent unit, and one or more electrical outlets operable to electrically connect to the power source through the detachable unit connector, permanent unit connector and the meter receptacle to provide construction power Various embodiments of the present invention may be used to provide technical advantages that include the capability to significantly reduce the time it takes for builders to construct facilities, including homes and buildings, by providing a device and method that allows for construction power and permanent power to be easily and conveniently provided.

Other technical advantages may include one of more of the following:

convenience outlets for a homeowner after construction is completed;

enhanced safety when using temporary power;

may remove an average of 10–15 days from the construction schedule;

reduces overall builder costs;

eliminates the need for temporary ESI-IDs;

reduces the number of calls a builder must make to REP to one to install permanent power and desired service turn-on date, thus allowing homes to close faster;

provides a convenient disconnect for the fire department in the case of a fire;

instant permanent power after city inspection of the structure;

immediate capability for homeowner to move into the structure; and builders obtain more control of their schedule;

Other technical advantages will be readily apparent to one skilled in the art from the following figures, description, and claims.

BRIEF DESCRIPTION OF THE DRAWINGS

For a more complete understanding of the present invention and the advantages thereof, reference is now made to the following drawings and detailed description, wherein like reference numerals represent like parts, in which:

FIG. 5a is a front view of another exemplary electric service device of the present invention;

FIG. 5b is a right side view of the exemplary electric service device of FIG. 5a;

FIG. 5c is a left side view of the exemplary electric service device of FIG. 5a;

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

Figure 1:
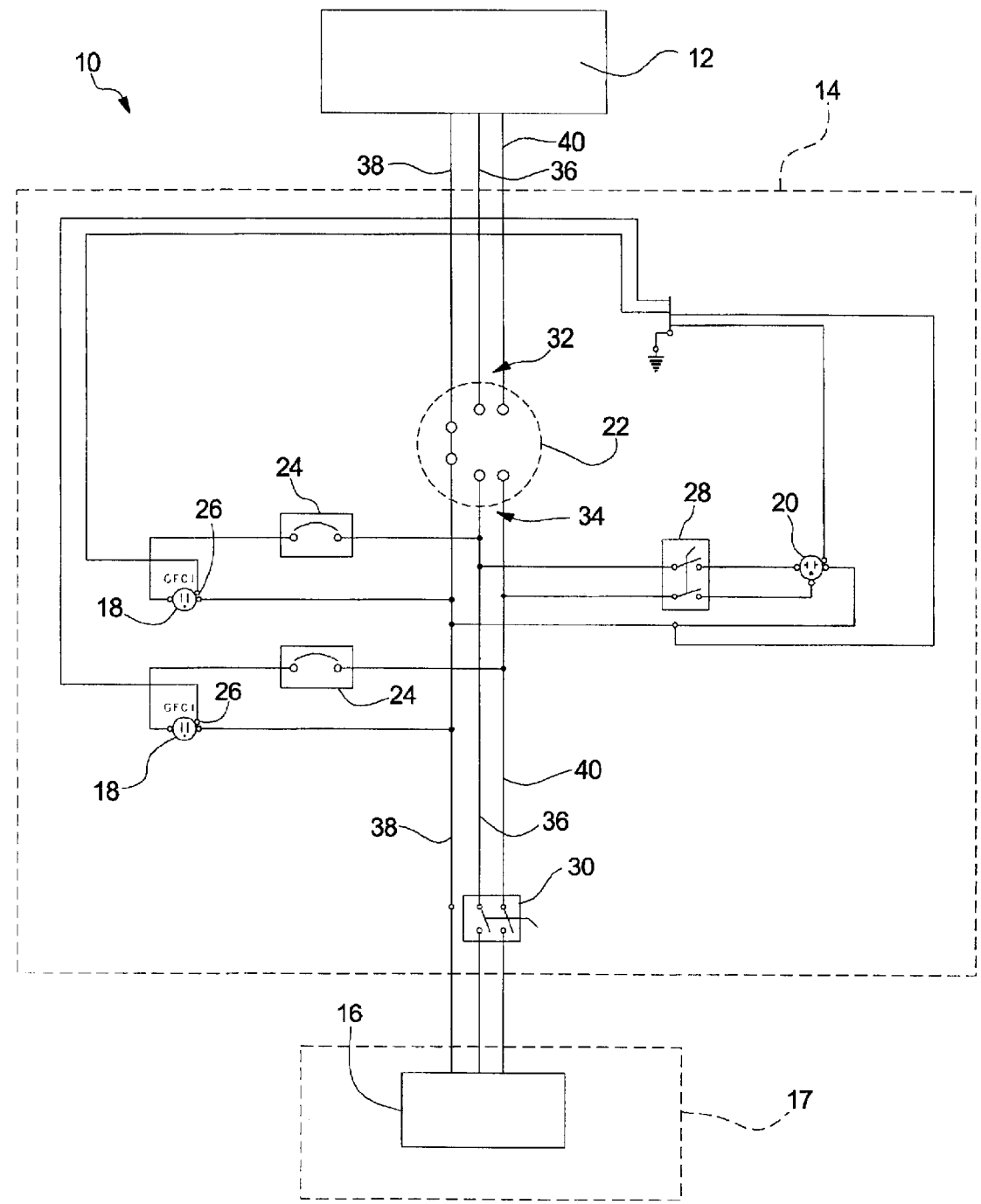
FIG. 1 is a schematic diagram illustrating an exemplary electric service device of the present invention for providing both construction power and permanent power at a facility during and after construction.

FIG. 1 is a diagram 10 that illustrates an electric service device 14 for providing both construction power and permanent power at a facility 17 during and after construction. It should be understood that the term construction power refers to temporary power or power that is provided while a facility 17 is being constructed, and permanent power refers to permanent power that is provided to the facility 17 after construction is substantially complete. The facility 17 may be any type of commercial or residential building or facility.

The electric service device 14 receives the power from a distribution power supply 12, such as a standard electric supply provided as AC power. When providing permanent power, the electric service device distributes the power from the distribution power supply 12 to the facility 17, typically by being connected to a main breaker box 16 provided in or near a building, residence, or other facility requiring permanent power. The electric service device 14 provides temporary or construction power through one or more electrical outlets provided within or proximal to the electric service device 14. The temporary power electrical outlets may include, for example, an electrical outlet 18, which may be provided as a 120 volt electric outlet, and an electrical outlet 20, which is shown, for example, providing electrical power at 240 volts. In an embodiment in which the electric service device 14 is used to provide three phase power, other temporary power outlets may be provided to provide three phase temporary power. Other variations and combinations of temporary power outlets will be apparent to those of ordinary skill in the art in light of the teachings provided herein.

In use, it is anticipated that the electric service device 14 will be used to provide temporary power (either metered or unmetered) to electrical outlets 18 and 20 (or other outlets) during the construction of the facility 17 for use by the builder. Then, after the facility 17 has been constructed and properly inspected, the electric service device 14 will be used to provide metered permanent power for use by the owner or resident of the facility 17. It should be noted that the electric service device 14 also may continue to provide power to the temporary power outlets when providing permanent power to the facility 17. For example, when the electric service device 14 is configured or set up to provide permanent power, electrical power may be provided at both the electrical outlet 18, the electrical outlet 20, and to the facility 17 through the main breaker box 16.

In the embodiment shown in FIG. 1, the electric service device 14 includes a meter receptacle 22, and an electrical outlet 18, which may be protected by any known circuit protection device, such as a line-current breaker 24 or over-current protection breaker along with a Ground Fault Circuit Interrupter ("GFCI") Breaker. The GFCI Breaker or other protective device may be integrated into the electrical outlet 18 or separate from the electrical outlet 18. The electric service device 14 also may include the electrical outlet 20, which also may be protected by any suitable protective device, such as a fuse or breaker. Preferably, electrical outlet 20 is protected by GFCI Breakers 28 to provide both ground fault current protection and line-current protection. The use of breakers and other protective devices provide increased safety while using any of the electrical outlets of the electric services device 14. Although the exemplary embodiments of the electric service device 14 described herein have two electric outlets, it will be readily understood that in various other embodiments the electric service device 14 may include one or more electrical outlets, and may be constructed to facilitate the addition or removal of electrical outlets.

The embodiment of the electric service device 14 shown in FIG. 1 further includes a switch 30. The switch 30 is used to switch the electric service device 14 between a construction power mode and a permanent power mode. The switch 30 may comprise any known power switching mechanism such as a conventional mechanical switch, a relay or other electromechanical device or any other arrangement known to one of ordinary skill in the art. The switch may or may not be provided with some form of overcurrent protection device. For example, in one embodiment the switch 30 may be provided with a thermally-activated overcurrent device that opens the switch 30 at a current of about 3,000 amps. In a preferred embodiment, the switch 30 is a conventional lever-operated mechanical disconnect switch. In the construction power mode, electricity is provided at electrical outlets 18 and 20 but not at the main breaker box 16. In the permanent power mode, electricity is provided at the electrical outlet 18, the electrical outlet 20, and the main breaker box 16. Of course, in other embodiments the electric service device 14 may stop providing power to electrical outlets 18 and 20 when it is providing power to the main breaker box 16 during the permanent power mode of operation.

The distribution power supply 12 may be virtually any known or available AC distribution power source typically used at residences and businesses. The distribution power supply 12 may be provided as a single phase electric power source or as a three phase electric power source and may be provided at any voltage, current or frequency. It should also be understood that the distribution power supply 12 may couple to the electric service device 14 through virtually any known or available means including, for example, underground connections and overhead connections.

The electric service device 14 may, in one embodiment, be provided in a metal housing that may be conveniently mounted to a pole or other structure such that the electric service device 14 may be set up and established before the facility 17 being constructed is actually completed or even begun. Any freestanding support may be used to support the electric service device 14 while providing construction power, as will be appreciated by those skilled in the art. Once the facility 17 is completed, the housing of the electric service device 14 may then be, in one embodiment, simply removed from the freestanding support and attached to the facility 17. In such an embodiment, it is preferable to ensure that the connection between distribution power supply 12 and the electric service device is provided with enough movement or slack to allow relocation of electric service device. Of course, in other embodiments, the electric service device 14 may remain at its original location after construction of the facility.

The meter receptacle 22 is operable to receive a power meter, such as a kwh power meter. The connection of the distribution power supply 12 to the meter receptacle 22 may be referred to as connected at the supply side 32 of the meter receptacle 22, and the connection between the main breaker box 16 and the meter receptacle 22 may be referred to connected at the load side 34 of the meter receptacle 22. Thus, the supply side 32 is the side where energy or power is provided to the meter receptacle 22 and the load side 34 is where energy or power will be provided or used by the electrical load.

In operation, the electric service device 14 may, in a preferred embodiment, be installed before construction begins or at an early stage of construction of a facility, building, or residence. Once connected to the distribution power supply 12 and the connection is approved by an inspector, such as a city code inspector, the switch 30 may be placed and locked in an open condition as shown in FIG. 1. This prevents electric energy from being provided to the main breaker box 16. It should be noted that the main breaker box 16 will not, generally, be provided at such an early stage of construction because the facility 17 has not yet been constructed and that is where the main breaker box 16 will generally eventually reside. In this state, it may be said that the electric service device 14 is providing temporary or construction power because the only power that may be provided through the electric service device 14 will be that provided through the electrical outlet 18 and the electrical outlet 20. Assuming that a meter has been previously installed in the meter receptacle 22, it is clear that the construction power consumed through the electrical outlet 18 and the electrical outlet 20 may be metered and the builder or developer may be appropriately billed.

In some regions where regulatory rules allow, it may be advantageous to provide or receive unmetered construction power rather than metered construction power. It should be understood that the present invention may be conveniently wired for use in either situation by connecting the electrical outlets 18 and 20 to either the supply side 32 of the meter receptacle 22 for unmetered power, or the load side 34 of the meter receptacle 22 for metered power.

Once the facility 17 is constructed and the main breaker box 16 and all necessary electrical wiring has been provided at the now fully-constructed facility 17, a city inspector may then switch or unlock the electric service device 14 such that the switch 30 is now closed and electric power will be available at the main breaker box 16 for use at the facility 17.

It should also be noted that FIG. 1 illustrates an example where the distribution power supply 12 is provided as a single phase source through a conductor 36, a neutral 38, and a conductor 40. The conductor 36 and the conductor 40 may be referred to as "hot" conductors while the neutral 38 may be grounded. As is illustrated, the electrical outlet 18 provides a 120 volt source that it is provided across the conductor 40 and the neutral 38. The potential difference between the conductor 36 and the neutral 38 is also 120 volts. The potential difference across the conductor 36 and the conductor 40 is provided, in this embodiment, as 240 volts. Thus, the electrical outlet 20 provides a 240 volt supply and is wired across the conductor 36 and the conductor 40.

It should be understood that the switch 30 may be implemented in any number of ways and using any number of mechanisms or devices known to one of ordinary skill in the art. When the switch 30 is provided in a "closed" state, the electric service device 14 is said to be providing permanent power, which almost certainly will be metered. In this state or condition, in a preferred embodiment permanent power is available not only at the main breaker box 16 but also at the electrical outlets 18 and 20. This provides the advantage of allowing for convenience outlets to be provided once a facility has been constructed and permanent power is now being provided.

Figure 2:
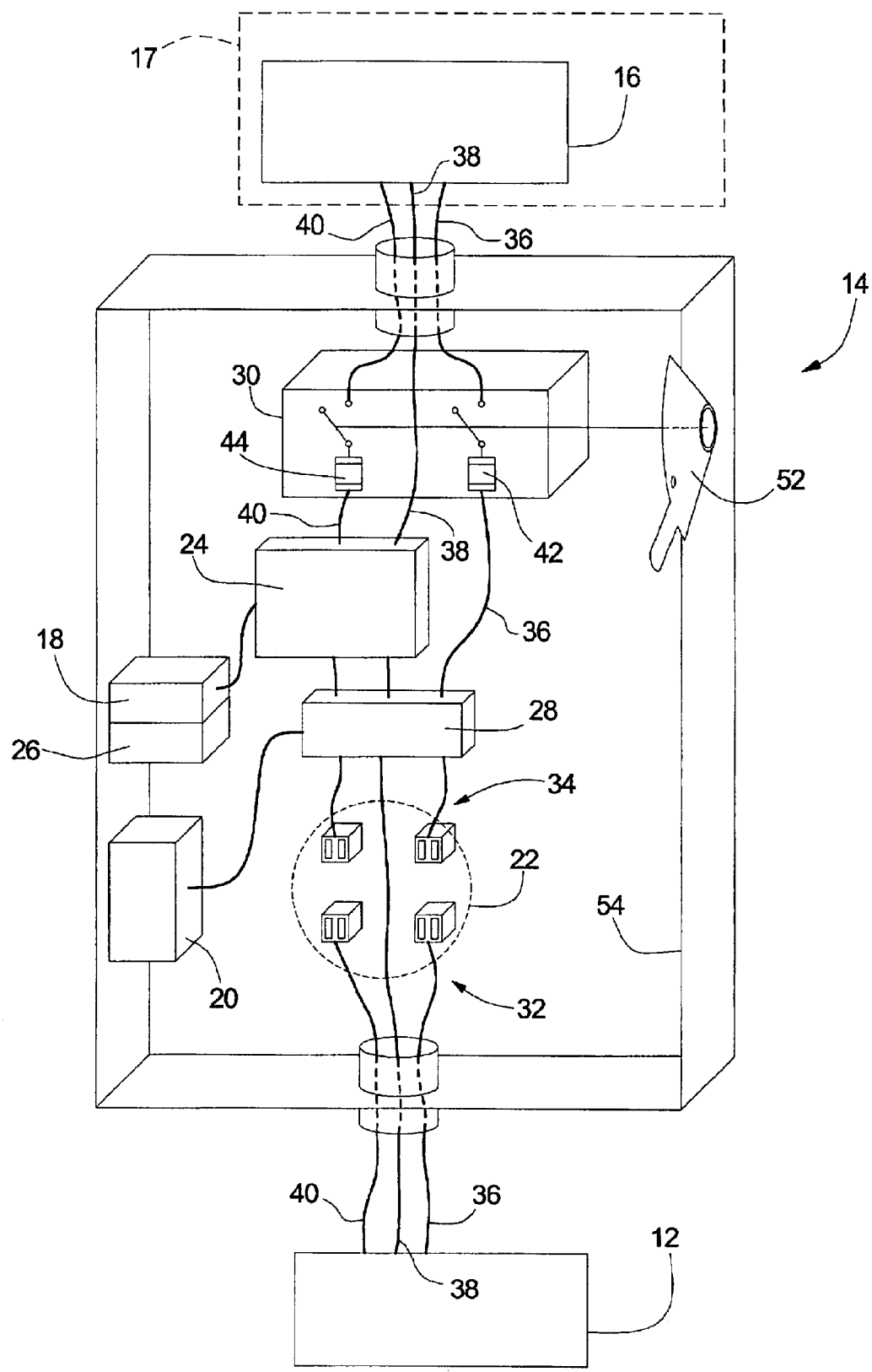
FIG. 2 is a diagram of a front view of an exemplary electric service device of the present invention.

In a preferred embodiment, such as the embodiment shown in FIG. 1, the switch 30 is not equipped with a fuse or fuses or overcurrent protection devices. However, the switch 30 may, in another embodiment, be provided with a fuse, an overcurrent breaker or other protective devices. For example, as shown in FIG. 2, a fuse 42 may be provided across the conductor 36, and a fuse 44 may be provided across the conductor 40. This may provide additional protection in the event that current surges are experienced through fuse 42 and/or fuse 44. The switch 30 may be provided as either a manual switch or as an automated or remotely controlled switch.

The switch 30 preferably also comprises some type of lockout mechanism that allows the switch 30 to be locked in an open state, a closed state, or in either state. For example, in a preferred embodiment, the switch 30 is provided with a lockable cover that prevents access to the switch. This lockout mechanism also may be a lockable lever mechanism that actuates the switch 30. Of course, any other known or available lockout mechanism may be used, as will be understood by one of ordinary skill in the art. The lockout mechanism preferably is controlled and locked by a city inspector or other inspecting authority.

Thus, the electric service device 14 in FIG. 1 allows construction power to be conveniently provided and metered. Thereafter, permanent power may be provided to a facility 17 and the electric service device 14 may operate in a typical manner and, in one embodiment, still provide convenience outlets located at the electric service device 14 itself for a building owner or resident. The electric service device 14 in the present invention is especially beneficial in a deregulated electricity market where it is cumbersome and time consuming to coordinate all of the necessary parties to timely provide both metered construction power and metered permanent power, while also ensuring that the consumption between the two is properly accounted for and billed by the appropriate retail electric provider. It is anticipated that the present invention will save an average of anywhere from 10 to 15 days in the completion of a residential construction project. This translates into large and substantial savings for builders and developers.

FIG. 2 illustrates a front view of the electric service device 14 that may be used in an embodiment of the present invention. The electric service device 14 in FIG. 2 is similar to that of FIG. 1 except that a housing 54 is expressly shown (with the front cover removed for clarity) and the arrangement of the electrical outlet 18 and the electrical outlet 20 are illustrated as being provided on the side of the housing 54. The housing 54 may comprise any conventional housing, such as an electrical housing, and may be equipped with weather insulation, punch-out holes, a lockable cover, mounting brackets and the like. The housing may further comprise safety and convenience features, such as a cover over the electrical outlets 18 and 20.

A switch arm 52 is shown on the exterior of the housing 54 and coupled to the switch 30 such that the switch 30 may be opened or closed to provide either construction power or permanent power, respectively. Of course, the meter receptacle 22 will, generally, be provided with a meter during the period in which both construction power and permanent power is provided through the electric service device 14. It should be understood, however, that the present invention is in no way limited in any manner to when a meter is provided at the meter receptacle 22. For example, the meter may not be provided in the meter receptacle 22 during the period when construction power is being provided, while a meter is provided at the meter receptacle 22 when permanent power is being provided. In various other embodiments, the switch arm 52 may be located inside the housing 54 or under a cover (not shown). In these embodiments, the switch arm 52 (or other suitable actuation device) may be locked by locking the cover or housing 54.

Figure 3:
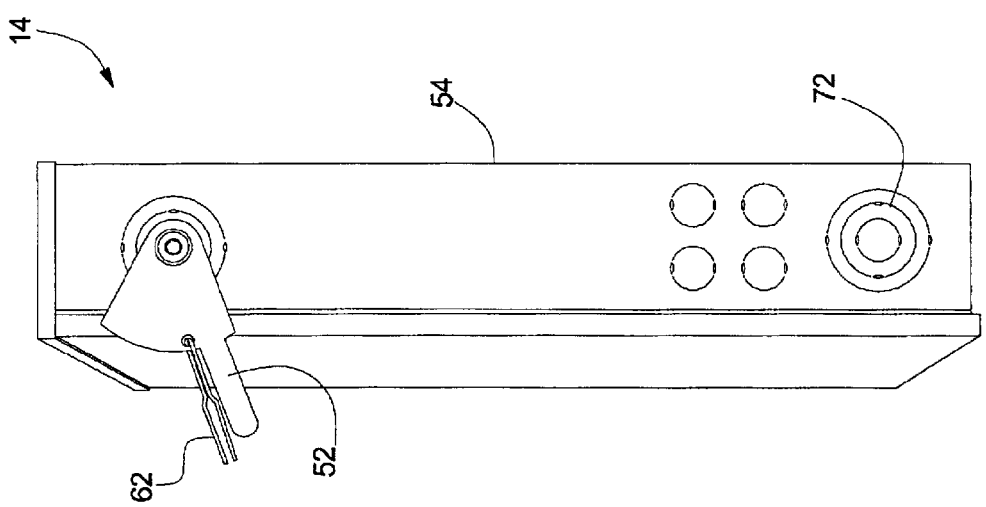
FIG. 3 is a right-side view of the electric service device of FIG. 2.

FIG. 3 is a right-side view of the electric service device 14 illustrating the switch arm 52 in a "locked" state using a removable locking mechanism 62 to provide construction power in accordance with an aspect of the present invention. The removable locking mechanism 62 may be any of a variety of mechanisms, such as padlocks, sealed locks and the like. Preferably, the removable mechanism is controlled and provided by an inspector, such as a city code inspector, to lock out the electric service device 14 either before construction begins or shortly after construction begins at a construction site. After construction is completed, the city inspector, after approving the inspection of the facility 17, may remove the removable locking mechanism 62 and place the switch arm 52 in the appropriate position to provide permanent power to the facility 17. In one embodiment, the switch arm 52 also may be locked in the permanent power position to prevent unintended interruptions of the power to the facility 17, however, it also may be desirable to leave the switch arm 52 unlocked to facilitate quick power disconnection in case of fires or other emergencies.

The switch arm 52 is shown on the exterior of the housing 54 and, in a preferred embodiment, the internal elements of the electric service device 14 will be protected and covered by the housing 54. It will also be understood that the switch arm 52 may be inside the housing 54. The meter receptacle 22 may be visible through the exterior of the housing 54, such as through a window to view a meter installed in the meter receptacle 22.

Figure 4:
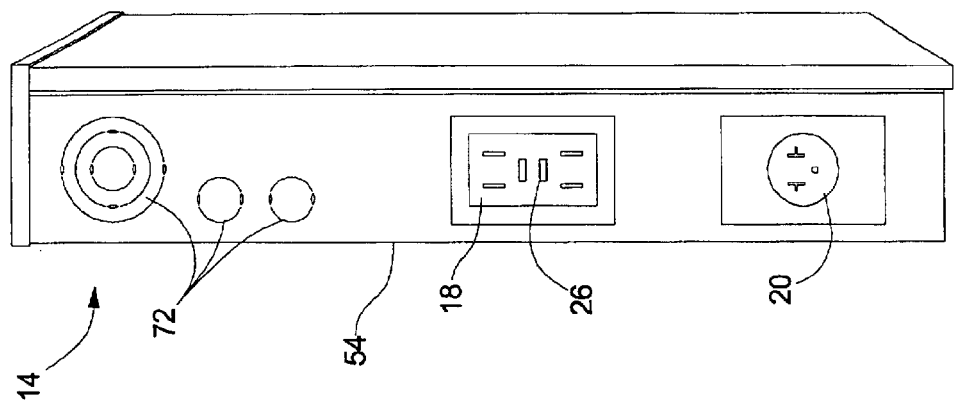
FIG. 4 is a left-side view of the electric service device of FIG. 2.

FIG. 4 is a left-side view of the electric service device 14 illustrating the positioning of the electrical outlet 18 and the electrical outlet 20 on the side of the housing 54 in accordance with one embodiment of the present invention. The electric outlet 18 is shown with a protection device, such as a GFCI breaker 26, integrated into one unit. The housing 54 additionally may include any number of cutouts, such as a cutout 72 as illustrated in FIG. 4, to allow for attachment of conduit, additional outlets, and so on.

Although the electrical outlets 18 and 20 may be provided without covers, in a preferred embodiment the electrical outlets 18 and 20 are provided with covers, such as spring loaded doors, that protect the outlets and help prevent accidental electrocution when the outlets are not in use. In another embodiment, the housing 54 may be provided with a cover that covers and protects the electrical outlets 18 and 20 even when they are being used.

FIGS. 5a, 5b, and 5c are front, right-side and left-side views of another embodiment of the invention: Although wiring and other internal components are not shown in FIG. 5a, it is understood that the embodiment of FIG. 5a is operable to provide similar features and functions as the embodiments described with reference to FIGS. 1–4. Specifically, the embodiment of FIG. 5a is operable to provide construction power in one mode, and permanent power in another mode. Also, like the embodiments of FIGS. 1–4, the embodiment of FIG. 5a is operable, in one embodiment, to provide power to the outlets used for construction power even when operating in the permanent power mode.

In the embodiment of FIG. 5a, the electric service device 514 is contained within a housing 554 having a meter 523 installed in the meter receptacle (not visible), preferably such that the meter 523 protrudes outside the housing 554. Electric service device 514 further comprises one 240 volt outlet 520, and two 120 volt outlets 518 to which construction power is provided. Power also may be provided to the outlets 518 and 520 during permanent power operation. The outlets may be protected by GFCI breakers, fuses, or other protective devices, as described elsewhere herein. In order to facilitate access to the protective devices and the wiring to the outlets 520 and 518, the housing 554 preferably comprises a first access door 502.

The electric service device 514 may be operated in construction power mode or permanent power mode, as described in more detail elsewhere herein. A switch (not shown), such as switch 30 described elsewhere herein or any other power switching device, may be used to change the operation mode of the electric service device 514. In a preferred embodiment, the switch of electric service device 514 is contained within the housing 554. The housing 554 preferably is provided with a second access door 504 to access the switch and the associated electrical connections. The housing 554 may be further provided with a third access door 506 to provide access to the permanent power wiring that connects the meter receptacle of the electric service device 514 to the facility (not shown).

The electric service device 514 may be equipped with a number of utility-enhancing features. For example, one or more of the first access door 502, second access door 504 and third access door 506 may be provided with a lock or lockable mechanism. The selection and use of such locks and lockable mechanisms will be understood by one of ordinary skill in the art. The electric service device 514 also may be equipped with other convenience features, such as mounting brackets 510, weather insulation (not shown), knock-out openings 512, and the like.

Figure 6:
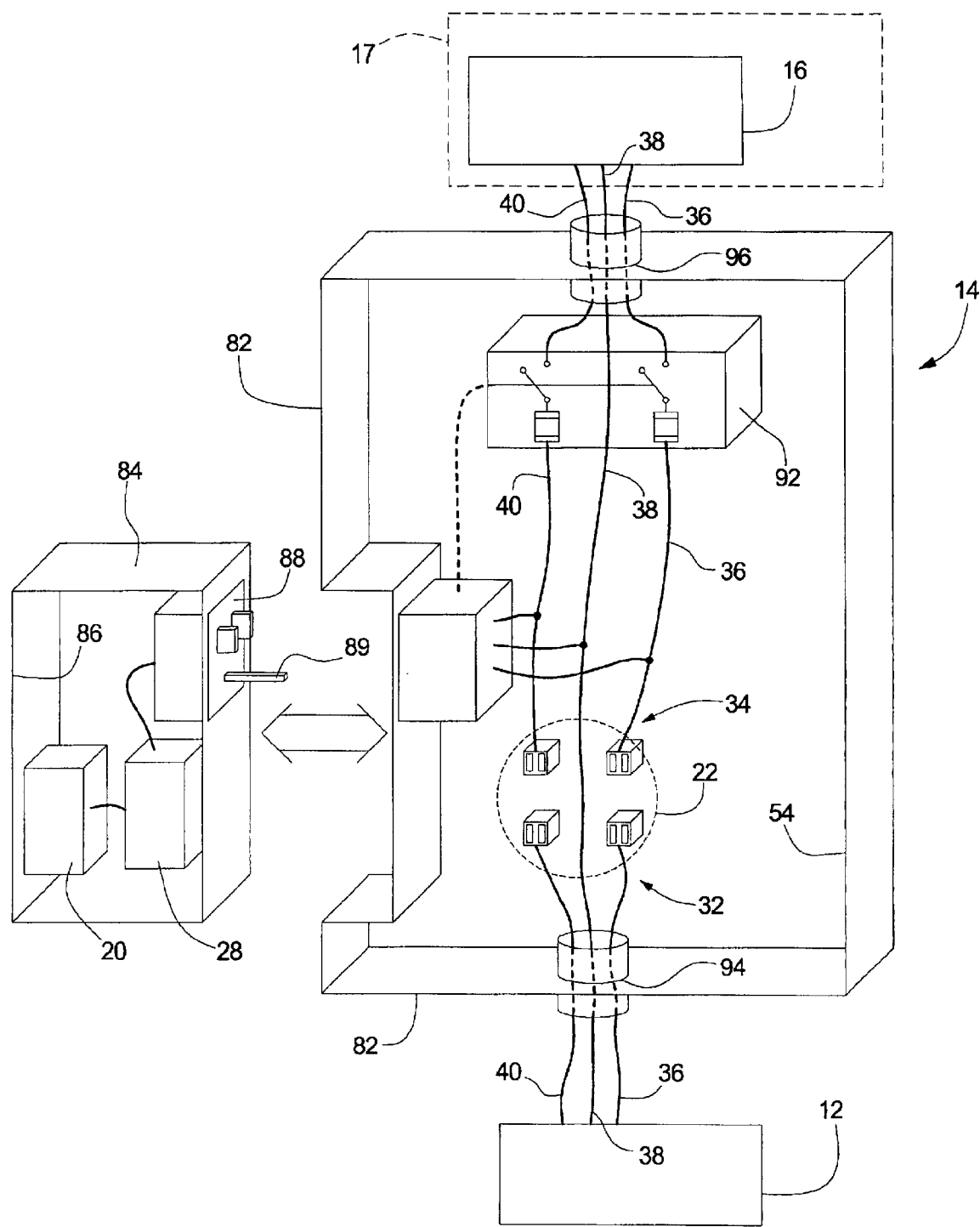
FIG. 6 is a diagram of a front view of another exemplary detachable electric service of the present invention.

FIG. 6 is a front view of another embodiment of the invention comprising a detachable electric service device 100. The detachable electric service device 100 includes a permanent unit 82 and one or more detachable units 84. As is illustrated, the detachable unit 84 mates or couples with the permanent unit 82 so that construction power may be provided through one or more electrical outlets 20 in the detachable unit 84. Any suitable outlet or outlets may be incorporated into the detachable unit 84. The exemplary detachable unit 84 is illustrated in FIG. 6 to include an electrical outlet 20 and GFCI Breaker 28 similar to those previously illustrated in connection with FIGS. 1–4.

The permanent unit 82 may, in one embodiment, be provided in a housing, similar to the housing 54 described previously in connection with FIGS. 2–4. As with the embodiment described in connection with FIGS. 2–4, the permanent unit 82 preferably may be mounted to the facility or residence that is being constructed and, once construction is completed, remain to serve as the meter box to provide metered permanent power at the facility. The permanent unit 82 also may be attached to a pole or other device during construction then later be moved to the facility, or may be left on the pole during permanent service.

The detachable unit 84 may, in one embodiment, be provided in one or more housings, such as a housing 86, and may be made of virtually any known or available material, such as a composite or metal material. In order to provide electricity to the detachable unit 84, The detachable unit 84 is provided with a detachable unit connector 88 that is adapted to couple with a similar permanent unit connector 90 in the permanent unit 82. The outlet 20 or outlets of the detachable unit 84 are electrically coupled to a detachable unit connector 88. The detachable unit connector 88 and permanent unit connector may comprise any suitable electrical interface, such as plugs or other electrical contacts, as will be understood by those of ordinary skill in the art.

In order to improve safety and prevent unauthorized tapping of power from the permanent unit connector 90 when the detachable unit 84 is not in use, the permanent unit connector 90 may be equipped with a mechanism that disconnects the permanent unit connector 90 from the distribution power supply 12 until the proper detachable unit 84 is installed. Preferably, this may be accomplished by providing the detachable unit 84 with a power activation mechanism 89 comprising a prong-like structure that engages with the permanent unit connector 90 to initiate the supply of power to the permanent unit connector 90. The power activation mechanism 89 may, for example, activate a spring-loaded switch (not shown) located within or near the permanent unit connector 90 that closes a set of electrical contacts between the permanent unit connector 90 and the distribution power supply 12. The power activation mechanism 89 also may simply press directly against spring-like electrical contacts to connect the permanent unit connector 90 to the distribution power supply 12. When the detachable unit 84 is removed, the power activation mechanism 89 pulls back and the spring loaded switch or contact returns to its original position, thereby interrupting the power connection to the permanent unit connector 90.

The detachable unit 84 may be used to provide temporary or construction power during the construction of a facility 17. The detachable unit 84 may then be moved or utilized at another construction site to also provide construction power by coupling with another permanent unit. This provides the advantage of reducing overall costs by minimizing the number of detachable units while reducing the overall costs of the permanent unit 82 and still providing many of the potential advantages of the present invention.

The permanent unit 82 comprises a means for receiving electrical power. In a preferred embodiment, the means for receiving electrical power is an opening 94 at the meter receptacle 22. The opening 94 preferably comprises a knock-out that may be removed to allow various different sizes of cable and/or conduit to be inserted in or attached to the permanent unit 82. The permanent unit connector 90 then couples with the conductor 36, the neutral 38, and the conductor 40 to provide an electrical connection to the detachable unit 84. The permanent unit 82 further includes a mechanism 92, such as the switch 30 of FIGS. 1–2. The mechanism 92 is operable to open and close the electrical connection between the main breaker box 16 and the load side 34 of the meter receptacle 22, and may be configured to operate in the manner described herein with reference to the switch 30. For example, the mechanism may be operated by a conventional lever-type switch located outside or within the housing 54 of the permanent unit 82. The mechanism 92 may be coupled with the main breaker box 16 of the constructed facility 17 through an opening 96 in the housing 54, such as the opening 94 described above, or by any other suitable means for receiving electric power lines, as will be understood by one of ordinary skill in the art.

The mechanism 92 is shown in FIG. 6 being coupled with the permanent unit connector 90 to illustrate the fact that in one embodiment the operation of the mechanism 92 may be dependent upon whether or not the detachable unit 84 is connected with the permanent unit 82. As noted before, in operation, the detachable unit 84 may be coupled with the permanent unit 82 through the detachable unit connector 88 and the permanent unit connector 90. This provides an electrical connection from the outlet 20 to the load side 34 of the meter receptacle 22. The interface between the detachable unit 84 and the permanent unit 82 may also be equipped with a mechanical, electrical, or other connection, such as the power activation mechanism 89 described herein, that opens the mechanism 92 when the detachable unit 84 is installed to interrupt power to the main breaker box 16. Such a mechanism would be useful to ensure that permanent power is not transmitted to the main breaker box 16 until the detachable unit 84 is removed. However, in a preferred embodiment, the supply of power to the breaker box 16 is unaffected by whether the detachable unit 84 is installed in the permanent unit 82 or not.

Once construction is complete and the constructed facility 17 has been approved, the detachable unit 84 may be removed while the permanent unit 82 may remain at the facility 17 and serve as a permanent metering facility. Once the detachable unit 84 is removed, the permanent unit 92 and facility 17 preferably are inspected to ensure compliance with applicable electrical codes and the mechanism 92 is then placed in a closed or unlocked state such that the main breaker box 16 is electrically connected to the load side of the meter receptacle 22. Thus, permanent power may be provided to the facility 17 and metered through a meter provided at the meter receptacle 22.

It should be understood that the mechanism 92 may be provided as a switch, a relay or electromechanical device, a mechanical connection, or any other arrangement known to one of ordinary skill in the art. In still other embodiments, the mechanism 92 may be controlled by manual or remote operation, as described herein with reference to switch 30, or may be controlled through the permanent unit connector 90.

In other embodiments, the detachable unit connector 88 and the permanent unit connector 90 may be provided such that they can be lockingly engaged so that the detachable unit 84 may not be removed from the permanent unit 82. In other embodiments not expressly illustrated in FIG. 6, any of a number of lockout devices may be provided to ensure that the detachable unit 84 stays coupled with the permanent unit 82. For example, the interfacing surfaces of the detachable unit housing 86 and the permanent unit housing 54 may be provided with interlocking devices that may be locked using a padlock or other known locking device.

Figure 7:
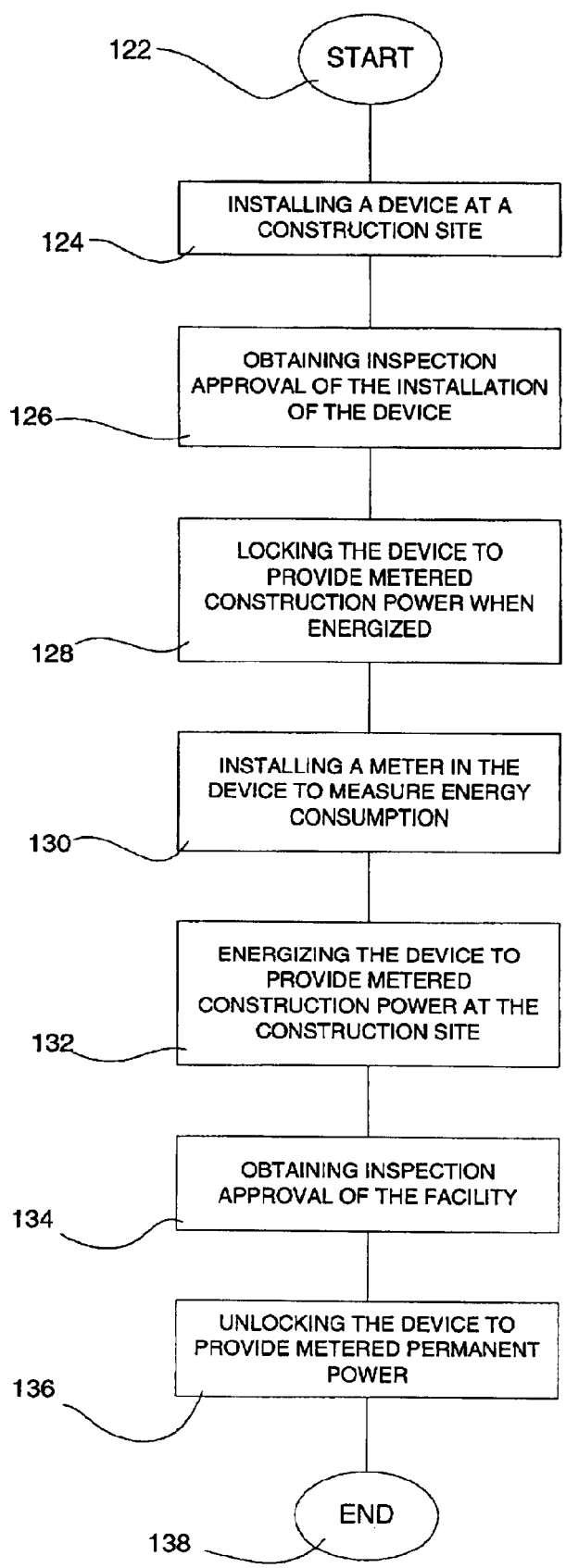
FIG. 7 is a flowchart of an exemplary method of the present invention for providing construction power during the construction of a facility and providing permanent power at the facility thereafter.

FIG. 7 is a flowchart that illustrates a method 120 for providing construction power during the construction of a facility and providing permanent power at the facility thereafter, according to one embodiment of the present invention. The method 120 begins at start block 122 and proceeds to block 124. At block 124, a device is installed at a construction site that, when energized, provides construction power through an electrical outlet at the device during construction of the facility and then is used to provide metered permanent power at the facility thereafter. For example, the electric service device 14 or the detachable electric service device 100, as described in the previous FIGUREs, may be installed before or at the beginning of the construction of a facility. In a preferred embodiment, a Retail Electric Provider ("REP") may be selected before the device is installed.

In some regions, such as in regions where electricity is deregulated, an electric service delivery point reference number may be obtained before a meter is ever installed in the device that is referenced at block 124. Depending on the regulatory scheme and regulatory rules, the electric service delivery point reference number may be obtained from an Independent System Operator ("ISO"), a Transmission Distribution Service Provider ("TDSP"), or by contacting a Retail Electric Provider ("REP"). In Texas, for example, the electric service delivery point reference number is referred to as an ESI-ID and can only be established through the TDSP contacting the ISO. These ESI-IDs are used by the ISO, which is the Electric Reliability Council of Texas ("ERCOT") in Texas, to clearly identify every point of electricity delivery, including temporary service or construction service. The electric service delivery point reference number is important in that it identifies each meter to the ISO, the TDSP, and the applicable REP.

The method 120 proceeds next to block 126 where an inspection is done and an approved inspection is obtained. The inspection may generally be performed by a code inspector, such as a city inspector or regional inspector, to ensure that the device is properly installed. Proceeding next to block 128, the device, such as the electric service device 14 or the detachable electric service device 100, may be locked to provide metered construction power when the device is electrically energized. In a preferred embodiment, the inspector that performed the inspection in block 126 provides the locking mechanism and controls the locking of the device. Preferably, the device will not be unlocked until construction of the facility is completed and the facility passes another inspection to ensure that it meets the appropriate electrical code or other code, and that it is safe to transfer power to the facility.

The method 120 proceeds next to step 130 where a meter is installed in the device to measure energy consumption. This energy consumption preferably is measured whether it is provided through the electrical outlets at the device to provide metered construction power or, after the facility is constructed and inspected, to provide metered permanent power. However, in regions that allow unmetered use of construction power, the meter may be replaced by jumpers or the device may be wired to provide electricity to the construction power outlets without going through a meter. In another embodiment, the electric service delivery point reference number will be received before the meter is installed in the device.

Proceeding next to block 132, the device is electrically energized to provide metered construction power at the construction site. In a deregulated environment, the previously selected REP will be the provider of the energy, and in a regulated environment, the incumbent utility will provide the energy.

The method 120 proceeds next to steps 134 and 136 where the facility has been substantially constructed and completed and inspection approval of the facility is obtained. In a preferred embodiment, the inspector that performs this inspection may then remove the lockout device or use some other means to place the device in a connected state to provide metered permanent electric service. At or before this point, the owner or resident of the facility may select a second or a different REP than the one that was used to provide the metered construction power during the construction of the facility. This may be achieved by contacting the desired REP to transfer electric service into the appropriate account name. As such, the electric service device of the present invention may be used to provide both metered construction power and metered permanent power. If the detachable electric service device 100 is used, the detachable unit may be detached from the device as part of the unlocking of the device to provide metered permanent power in block 136. The method 120 ends at block. 138.

As an example, and without limitation to the present invention, the following provides an example of the steps that may be taken to provide metered construction power and metered permanent power according to an aspect of the present invention:
1. Builder's Electrician Sets Electric Service Device of the present invention (hereinafter "Device");
2. Builder Calls REP to request connection and turn on date;
3. REP requests ESI-ID from TDSP for Device;
4. TDSP sends ESI-ID back to REP;
5. REP sends message to ERCOT that they are the energy supplier for that ESI-ID;
6. ERCOT approves service start;
7. Builder requests city inspection;
8. City schedules site inspection;
9. If Device passes city inspection then the city inspector "locks out" the safety switch in the off position;
10. If Device passes city inspection a fax is sent to TDSP noting approval;
11. City inspection approval initiates the meter to be set at the Device by the TDSP;
12. TDSP rolls truck to set meter;
13. Builder constructs the facility;
14. Builder requests city inspection for final building inspection;
15. City schedules site inspection;
16. If the structure passes city inspection, the city removes lock out of the Device;
17. Builder repositions switch arm to the on position to energize home and transfer to permanent power;
18. Builder closes on house;
19. Homeowner calls REP to transfer power into homeowner's name;
20. REP contacts TDSP to obtain a final meter reading; and
21. REP transfers power from builder account to homeowner's account.

These steps just listed significantly reduce the complexity and timing of scheduling and having electric power provided as construction power and then as permanent power. In particular, the use of the present device allows power to be switched from construction power to permanent power without having to call in the utility company to set up a second meter for the completed facility, which can be time consuming and add additional expense. The present device and method also requires only one inspection by the controlling authority, which is the city in this example. In contrast, previously known devices required at least two inspections: a first inspection to approve the supply of construction power, and a second inspection to approve the supply of permanent power. By eliminating the need for a second inspection step (although such a step may still be performed in some embodiments, such as when mandated by the local regulatory authorities), the present invention provides an advantage of reducing the construction time of the facility, which leads to numerous other benefits such as those that have been described elsewhere herein. The present invention also requires only one multiple electric service delivery point reference number (ESI-Id) to be assigned to each facility location, reducing the likelihood of inadvertent power interruptions and other problems attendant to requiring the construction power unit to have one ESI-ID and the permanent power unit to have another ESI-ID. It is also believed that the reduced complexity provided by using the present invention will encourage owners of facilities built with the present device to continue to use the same REP that the builder used even after construction is complete, providing an advantage to REPs that encourage builders to use the present invention because those REPs will enjoy continued income from the facility owner or user.

As is illustrated, the device and method of the present invention may provide significant advantages to overcome the difficulties and complexities of providing both temporary or construction power and then permanent power when a facility is constructed. Although the preferred embodiment has been described in detail, it should be understood that various changes, substitutions, and alterations can be made herein without departing from the scope of the present invention, even if all of the advantages identified above are not present. For example, the various elements or components of the present invention may be supplemented, combined or integrated with another system or certain features may not be implemented. Also, the components, techniques, systems, sub-systems, and methods described and illustrated in the preferred embodiment as discrete or separate may be combined or integrated with other components, systems, modules, techniques, or methods without departing from the scope of the present invention. The present invention may be implemented to function using virtually any available electricity regulatory setup, including both regulated and deregulated electricity markets. Other examples of changes, substitutions, and alterations are readily ascertainable by one skilled in the art and could be made without departing from the spirit and scope of the present invention.

What is claimed is:

1. A device to provide electric service to a construction site, the device comprising:
   a meter receptacle having a supply side and a load side, the meter receptacle operable to electrically connect between a power source at the supply side and a facility at the load side, the meter receptacle operable to receive a meter to measure the electrical energy provided by the power source through the meter receptacle;
   a switch electrically connected to the meter receptacle, the switch being operable to position in at least a construction power position and a permanent power position, the switch being operable to disconnect the electrical connection between the facility and the meter receptacle while in the construction power position, and the switch being operable to electrically connect the facility and the meter receptacle while in the permanent power position; and
   one or more electrical outlets operable to electrically connect to the power source at least when the switch is in the construction power position.

2. The device of claim 1, wherein the switch is operable to be locked in at least one of the construction power position and the permanent power position.

3. The device of claim 1, wherein the facility comprises a breaker and the meter receptacle is operable to electrically connect between a power source at the supply side and the breaker at the load side.

4. The device of claim 3, wherein the breaker is a main breaker of a main breaker service panel at the facility.

5. The device of claim 1, wherein the one or more electrical outlets are operable to electrically connect to the power source through the load side of the meter receptacle.

6. The device of claim 1, wherein the one or more electrical outlets are operable to electrically connect to the power source through the supply side of the meter receptacle.

7. The device of claim 1, wherein the at least one of the one or more electrical outlets includes a ground fault circuit interrupter breaker.

8. The device of claim 1, further comprising:
   a ground fault circuit interrupter breaker and a line current breaker operable to electrically disconnect at least one of the one or more electrical outlets from the power source when either a ground fault is detected at the electrical outlet or a current to the electrical outlet is exceeded.

9. The device of claim 1, wherein the one or more electrical outlets comprise:
   at least one first electrical outlet operable to provide electrical power from the power source at a first peak voltage;
   at least one second electrical outlet operable to provide electrical power from the power source at a second peak voltage.

10. The device of claim 9, wherein alternating current is provided through the at least one first electrical outlet and the at least one second electrical outlet, and the first peak voltage is over 100 volts, and the second peak voltage is over 200 volts.

11. The device of claim 1, wherein the power source is a single phase power source.

12. The device of claim 1, wherein the power source is a three phase power source.

13. The device of claim 1, further comprising:
   a fused connection between the switch and the meter receptacle such that the fused connection will open when a specified current is exceeded through the electrical connection between the switch and the meter receptacle when the switch is in the permanent power position.

14. The device of claim 1, further comprising a meter electrically connected to the meter receptacle to bridge the supply side and the load side and to measure the electrical power provided through the meter receptacle.

15. The device of claim 1, wherein the facility is a residential structure.

16. The device of claim 1, wherein the facility is a commercial structure.

17. The device of claim 1, wherein the power source is provided from an electrical distribution system through an underground connection.

18. The device of claim 1, wherein the power source is provided from an electrical distribution system through an overhead connection.

19. The device of claim 1, wherein the meter receptacle and the one or more electrical outlets are provided in one or more housings.

20. The device of claim 19, wherein at least one of the one or more housings is mounted to a freestanding support.

21. The device of claim 19, wherein at least one of the one or more housings is mounted to the facility.

22. The device of claim 1, wherein the meter receptacle is provided in a first housing, and the one or more electrical outlets are provided in a second housing.

23. The device of claim 1, wherein the meter receptacle and the switch are provided in a first housing, and the one or more electrical outlets are provided in a second housing.

24. The device of claim 1, wherein the one or more electrical outlets are electrically connected to the load side of the meter receptacle.

25. The device of claim 1, wherein the one or more electrical outlets are electrically connected to the supply side of the meter receptacle.

26. A detachable device to provide electric service to a construction site, the device comprising:
   a permanent unit comprising:
      a means for receiving electric power lines to couple with a power source,
      a means for receiving electric power lines to couple with a facility,
      a meter receptacle having a supply side and a load side, the meter receptacle operable to electrically connect between the power source at the supply side and the facility at the load side, the meter receptacle operable to receive a meter to measure the electrical energy provided by the power source through the meter receptacle,
      a permanent unit connector electrically connected to the meter receptacle, and a mechanism operable to open and close the electrical connection between the facility and the meter receptacle of the permanent unit, wherein the permanent unit connector remains electrically connected to the meter receptacle at least when the electrical connection between the facility and the meter receptacle is open; and a detachable unit comprising:
a detachable unit connector operable to electrically couple with the permanent unit connector, and
one or more electrical outlets operable to electrically connect to the power source through the detachable unit connector, permanent unit connector and the meter receptacle to provide construction power.

27. The device of claim 26, further comprising a means for disconnecting the electrical connection between the permanent unit connector and the meter receptacle when the detachable unit is not connected to the permanent unit.

28. The device of claim 27, wherein the means for disconnecting the electrical connection between the permanent unit connector and the meter receptacle comprises a power activation mechanism.

29. The device of claim 26, further comprising a means for disconnecting the electrical connection between the facility and the meter receptacle when the detachable unit connector is coupled with the permanent unit connector.

30. The device of claim 26, wherein the meter receptacle and the permanent unit connector are provided in a first housing, and wherein the one or more electrical outlets and the detachable unit connector are provided in a second housing.

31. The device of claim 26, wherein the meter receptacle, the permanent unit connector, and the mechanism are provided in one or more housings.

32. The device of claim 26, wherein the one or more electrical outlets and the detachable unit connector are provided in one or more housings.

33. The device of claim 26, further comprising a means for lockingly engaging the permanent unit connector and the detachable unit connector.

34. The device of claim 26, further comprising a means for lockingly engaging the permanent unit and the detachable unit relative to one another.

35. The device of claim 26, wherein at least one of the one or more electrical outlets comprises a ground fault circuit interrupter breaker.

36. The device of claim 26, wherein the detachable unit comprises a line current breaker and a ground fault circuit interrupter breaker.

37. The device of claim 26, further comprising a meter electrically connected to the meter receptacle to bridge the supply side and the load side and to measure the electrical power provided through the meter receptacle.

38. The device of claim 26, wherein the mechanism is operable to lock open the electrical connection between the breaker at the facility and the load side of the meter receptacle of the permanent unit.

39. A method for providing construction power during the construction of a facility and providing permanent power at the facility thereafter, the method comprising:

installing a device at a construction site that, when energized, is operable to provide metered construction power through an electrical outlet at the device during construction of the facility and to provide metered permanent power at the facility thereafter;

obtaining inspection approval of the installation of the device;

locking the device to provide metered construction power when energized;

installing a meter in the device to measure energy consumption of metered construction power and metered permanent power;

energizing the device to provide metered construction power at the construction site;

obtaining inspection approval of the facility; and unlocking the device to provide metered permanent power.

40. The method of claim 39, further comprising:
selecting a retail electric provider before obtaining inspection approval of the installation of the device.

41. The method of claim 40, further comprising:
obtaining an electric service delivery point reference number before installing a meter in the device.

42. The method of claim 41, wherein obtaining an electric service delivery point reference number includes requesting an electric service delivery point reference number from the retail electric provider.

43. The method of claim 41, wherein obtaining an electric service delivery point reference number includes requesting an electric service delivery point reference number from a transmission distribution service provider.

44. The method of claim 41, wherein the electric service delivery point reference number is issued by an independent system operator.

45. The method of claim 39, further comprising:
selecting a second retail electric provider to provide metered permanent power.

46. The method of claim 39, further comprising:
contacting the retail electric provider to transfer electric service into the name of the facility's owner.

47. The method of claim 39, further comprising:
completing construction of the facility after obtaining inspection approval of the facility.

48. The method of claim 47, wherein the device is not unlocked until construction of the facility is completed.

49. The method of claim 39, wherein the electrical outlet provides power during both metered construction power and metered permanent power.

* * * * *

UNITED STATES PATENT AND TRADEMARK OFFICE
CERTIFICATE OF CORRECTION

PATENT NO. : 6,765,787 B2
DATED : July 20, 2004
INVENTOR(S) : Beasley, III et al.

It is certified that error appears in the above-identified patent and that said Letters Patent is hereby corrected as shown below:

Title page,
Item [73], Assignee, after "Resources" please insert -- , --.
Item [56], References Cited, U.S. PATENT DOCUMENTS, please insert the following:
-- 4,864,467 A    9/1989    Byrd et al. ................361/369
   5,097,383 A    3/1992    Heard et al. ................361/367
   5,726,507 A    3/1998    Tipton .....................307/147
   5,838,078 A    11/1998   Tipton .....................307/147 --.

Signed and Sealed this

Thirtieth Day of August, 2005

JON W. DUDAS
*Director of the United States Patent and Trademark Office*